United States Patent

Rodgers et al.

[11] 3,891,832
[45] June 24, 1975

[54] AVIONICS DISPLAY CIRCUIT HAVING OPTICAL FEEDBACK AND A ROTARY SOLENOID ACTUATOR THEREIN

[75] Inventors: Daniel L. Rodgers; Thomas F. Cater, both of Olathe, Kans.

[73] Assignee: King Radio Corporation, Olathe, Kans.

[22] Filed: Mar. 23, 1973

[21] Appl. No.: 344,234

[52] U.S. Cl. ........ 235/150.2; 340/27 R; 340/27 NA; 335/272
[51] Int. Cl. .......................... G06g 7/78; G06g 7/70
[58] Field of Search... 235/150.2; 340/27 R, 27 NA; 335/272

[56] References Cited
UNITED STATES PATENTS

| 3,382,351 | 5/1968 | Schweighofer et al. | 235/150.22 |
| 3,577,195 | 5/1971 | Clift | 340/27 R |
| 3,654,597 | 4/1972 | Cox | 340/27 NA |

*Primary Examiner*—Felix D. Gruber
*Assistant Examiner*—R. Stephen Dildine, Jr.
*Attorney, Agent, or Firm*—Lowe, Kokjer, Kircher

[57] ABSTRACT

The improvement includes a unique indicator and associated circuitry for glide slope and localizer data. The device has a closed loop circuit with an optical position transducer therein. The circuit loop operates in conjunction with the received raw data from the glide slope and localizer transmitters to accurately locate a pointer (or indicator) controlled by a unique rotary solenoid actuator.

10 Claims, 6 Drawing Figures

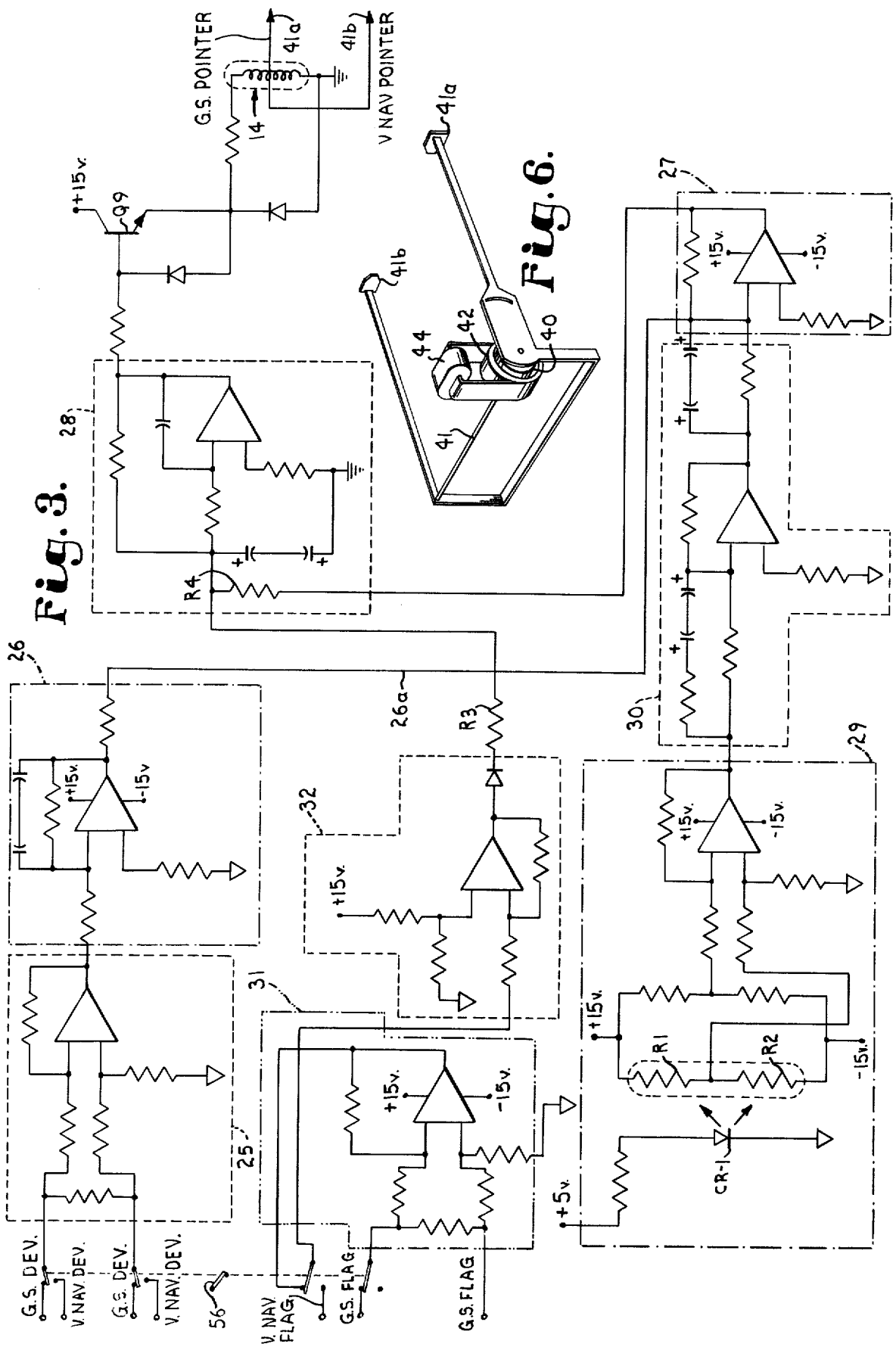

AVIONICS DISPLAY CIRCUIT HAVING OPTICAL FEEDBACK AND A ROTARY SOLENOID ACTUATOR THEREIN

BACKGROUND AND BRIEF DESCRIPTION OF THE INVENTION

In an ILS (instrument landing system), two transmitters are located near an airport to transmit an electrical signal corresponding to glide slope and localizer information. The airborne ILS equipment will include two receivers with corresponding display(s), that being a glide slope display and a localizer display, both of which conventionally use plus or minus 150 microamp meter movements. Meter movements currently representing the state of the art are of the d'Arsonval type which operate from an open loop in an effort to process the raw data.

The information presented by the various indicators may also be routed to an auto pilot and/or flight director when available. The raw data is processed in the auto pilot and/or flight director and is utilized to automatically operate the flight controlling surfaces of the aircraft. In any event, when an auto pilot effectively flies the airplane, the pilot will nonetheless visually monitor appropriate meter movements to ascertain that the auto pilot is operating correctly.

The subject invention has primary utility with avionics equipment indicating the above described glide slope and localizer data. However, other indicators heretofore requiring d'Arsonval meter movements may benefit substantially by the unique circuit combination and rotary solenoid actuator. For illustrative purposes, the glide slope data is received and summed together with the output from an optical position transducer. Additionally, a flag signal input is delivered to the summer circuit. In this fashion, a closed loop is formed for operating the rotary solenoid and thusly moving the indicator pointer to the proper location.

The rotary solenoid is provided with a pair of retract poles which automatically moves the indicator pointer, via a rotary magnet, out of view if a flag signal (or loss of power) occurs and is accomplished without the use of springs or other tension biasing methods. Further, two pointers are in fact operated by the single magnet. A scale is provided for each pointer and a switch means permits either one of the two scales to have pertinent data thereon.

An object of the invention is to provide a uniquely constructd circuit and indicator for visually displaying glide slope and localizer data.

A further object of the invention is to provide a circuit of the character described which utilizes a closed loop and which has obviated the necessity of conventional d'Arsonval meter movement indicator devices.

A still further object of the invention is to provide a uniquely constructed rotary solenoid indicating device that has particular utility when utilized in an avionics display device.

Another object of the invention is to provide a device capable of accepting selectable inputs and displaying data corresponding to the inputs on at least two scales. This feature is accomplished at least in part by the actuator having two pointers thereon and a switch means capable of causing the desired scale to be read at the proper time.

Another object of the invention is to provide a closed loop circuit of the character described above which incorporates the utilization of an optical transducer in conjunction with a uniquely costructed rotary colenoid for optimizing the display of glide slope and localizer data to the pilot utilizing subject device.

Another object of the invention is to provide a uniquely constructed display device for avionics equipment which is extremely rugged, substantially impervious to the ambient conditions surrounding the indicator, and which provides reliable flag or failure information when the appropriate signals are not being received. It is a feature of this object that the circuitry utilized therewith is a closed loop circuit and that a rotary solenoid replaces more conventional d'Arsonval meter movements within the circuit. The rotary solenoid, with feedback and retract poles, optimizes the flag condition positioning of the indicator pointer used therewith in a manner not known in any prior art devices.

A further object of the invention is to provide a unique circuit and actuating device for use in avionics equipment of any type which presents a visual indication of electrically received raw data. It is a feature of the invention that it is particularly applicable to glide slope and localizer information but it should be understood that the subject invention is adaptable to and advantageously used with many other types of avionics equipment.

Another object of the invention is to provide uniquely constructed visual display for avionics equipment that is inexpensive, reliable and substantially insensitive to vibrations and dusty atmosphere.

A further object is to provide an improved avionics display device which insures that accurate updated information is being displayed thereon. It is a feature of the invention that the closed loop circuit and optical transducer cooperate in updating the displayed data for optimizing pilot monitoring and corrective actions.

These and other ojects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 3 is a more detailed circuit diagram of the circuitry shown in FIG. 2;

FIG. 6 is a perspective view of the rotary solenoid and associated pivotal pointer carrying mechanism.

Figure 2:
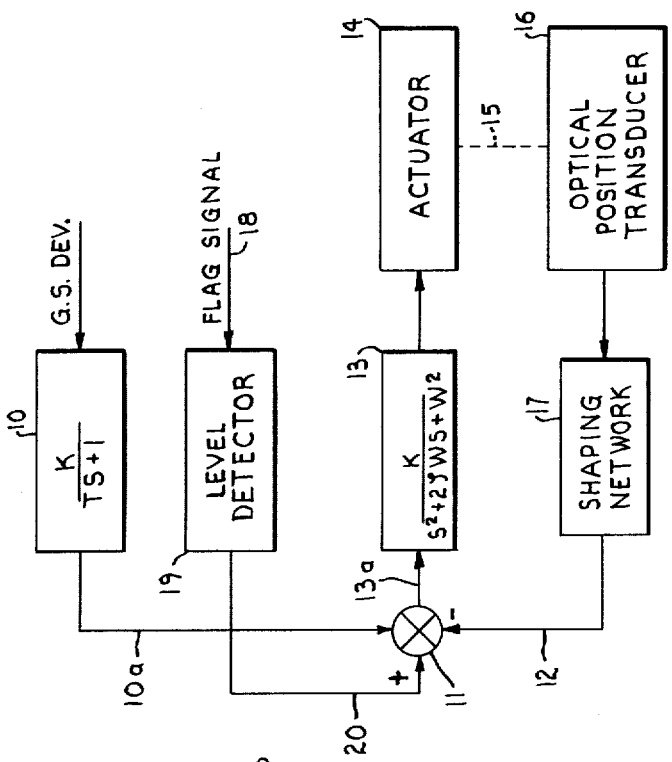
FIG. 2 is a block diagram of the closed loop circuit employed with the subject invention.

Turning now more particularly to the block diagram shown in FIG. 2, the glide slope deviation signal from the ILS transmitter is initially delivered to a first order lag filter 10. This filtered signal is then fed to a summer 11 via the line 10a. As will be seen, a feedback signal will be present on line 12 and also directed to summer 11. The third input thereto includes the flag signal input (on line 18) which is sent through level detector 19 and finally fed to the summmer via line 20. Accordingly, summer 11 sums the glide slope deviation signal with some gain applied thereto on line 10a with the feedback signal on line 12 and further with the flag signal after passing through level detector via line 20.

In any event, the glide slope deviation signal, combined with the other two signals, is directed to a second order lag filter indicated by 13 via line 13 via line 13a. From here (filter 13) the signal is directed to the actuator 14 with the output of same being mechanically linked via 15 to the optical position transducer 16. The optical position transducer has an output directed to the shaping network 17 and from thence via the above described line 12 back to summer 11. It should be noted that the optical position transducer is similar in design and operability to that detailed in the copending application of Clarence Van Englehoven, filed Mar. 28, 1973, and bearing Ser. No. 345,487, Optical Course Datum Heading Selection Transducer, and which is owned by the same assignee as the subject invention.

As will be seen, the above described block diagram is a closed loop device with both the glide slope deviation and flag signal being delivered to the summer 11. Further, the actuator which will be described in more detail later, operates to move the indicator pointer(s) to the appropriate position and further will automatically remove the pointer from sight when a "flag condition" is to be displayed. This particular circuit provides a substantial increase in band width thereby accurately presenting information to the pilot with little or no lag. Accordingly, data is presented for aircraft operation that can be acted upon almost instantaneously and will not present late or needless information which could heretofore arrive after aircraft navigation correction maneuvers were needed.

A more complete circuit diagram, disclosed in FIG. 3, operates in a similar fashion to that discussed with respect to the block diagram in FIG. 2. The circuitry (in FIG. 3) will likewise be discussed in terms of glide slope deviation with the glide slope deviation signal input means shown in the upper left hand corner thereof. As will be seen VNAV information and the two pointer concept are further improvements. The operational amplifier circuit generally indicated by the number 25 operates to provide a proper impedance matching element for the input signal and gain scaling and also rejects the common mode voltage accompanying the received signal. The operational amplifier circuit 25 (as shown including the associated resistors) accepts standard glide slope ARINC inputs for further utilization thereof. The output from the operational amplifier circuit 25 is directed to a first order lag filter generally represented by the numeral 26. This operational amplifier circuit including the associated resistors and capacitors gets rid of noise and is generally a gain one element with a half a second first order lag designation.

The output from the operational amplifier circuit 26 is delivered via line 26a to a summer circuit 27. This circuit (including its associated operational amplifier) is a gain five stage which increases the amplitude of the deviation signal to a proper level for further operation thereof. The output of the summer 27 is delivered to the second order lag filter circuit identified by the numeral 28 includes the indicated operational amplifier with the various capacitors and resistors. Accordingly, the circuit has taken a low level signal at the glide slope input of approximately 150 micro amps and has amplified same and rejected all unwanted components so that a proper output from the second order lag filter circuit 28 is delivered to the transistor Q9. The output from Q9 on the emitter thereof is delivered to the actuator and glide slope indicator which is a rotary solenoid that will be discussed in more detail with respect to FIGS. 4 and 5. Transistor Q9 will have positive voltage from the indicated power supply coming in on the collector thereof so that the output from the second order lag filter 28 is controlled in a linear fashion as it is being fed to the glide slope pointer and indicator (conveniently referred to in both FIGS. 2 and 3 by the numerals 14). The optical position transducer is indicated by the numeral 29 in FIG. 3 and operates in a manner similar to that disclosed in the above mentioned patent application of Clarence Van Englehoven. As discussed in the Van Englehoven application, a light emitting diode (CR1) will illuminate a portion of two photo resistors R1 and R2 which are located in the associated bridge circuit. Since the glide slope pointer has a movable shutter (not shown) associated therewith that controls the amount of light impinging on the photo resistors, the bridge circuit configuration will produce a differential voltage directly proportional to the position pointer. This optical circuit produces a position signal directly proportional to the glide slope pointer position with the output of same going to another operational amplifier circuit 30 that develops a differential signal and impedance matches the input thereto. Actually, the operational amplifier circuit 30 may be thought of as a shaping circuit since, with any servo mechanism and in particular with the rotary solenoid discussed latter, the device will be in operation at a fast rate even though the feedback is somewhat slower. Accordingly, a lead network compensating for the difference in rates is utilized herein. This circuit actually will derive the first derivative of the pointer position signal proportional to the change occurring so that the feedback loop may react accordingly.

The output from the circuit 30 is directed to the above mentioned summer circuit 27 thereby closing the loop and obtaining a stabilized output from the actuator (the rotary solenoid). With a positive input being delivered to the summer, the output signal resulting from the pointer movement generates in effect a negative signal which cancels the positive input. Accordingly, the error signal emanating from summer 27 operates to keep the glide slope pointer properly positioned. As a result, a gradual shift in pointer indication is obtained and the accuracy of same along with ability to track the input are substantially increased over what has heretofore been known in the avionics art.

Also indicated on the left hand portion of FIG. 3 is an input designated as GS flag or glide slope flag. This input, via the appropriate switch contacts, is delivered to an impedance matching stage which includes the operational amplifier generally indicated by the numeral 31. This stage also has a substantial gain with the output of same being directed to a hysteresis switch level detector 32. This operational amplifier (32) operates to monitor the input voltage so that when same reaches a certain level it changes or immediately increases to the large positive voltage. When the glide slope flag level reaches a certain stage, (the flag level normally is about 260 micro amp magnitude), it is required that a flag condition be shown. In this event, the output from the hysteresis switch level detector 32 is delivered directly to the operational amplifier circuit 28 along with the summer output from the circuit 27. The signal outputs through resistors R3 and R4 are delivered to the circuit 28 and operate to turn off transistor Q9 which effectively cuts off the power to the glide slope pointer actuator circuit. As will be shown, glide slope pointer is then magnetically pulled out of view so that if there was any type of a loss of power, the magnet action itself will automatically remove the pointer from view. Actually, the operation of the flag signal is to bias transistor Q9 in such a fashion that it is turned off so that the associated magnetic circuits in the rotary solenoid are not energized.

Figure 5:
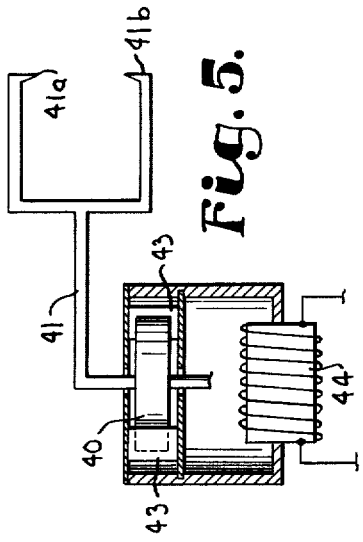
FIG. 5 is a partial sectional view showing the rotary solenoid actuator from the side indicating the position of the retract pole pieces in conjunction with the deflection poles and rotary magnet.
Figure 4:
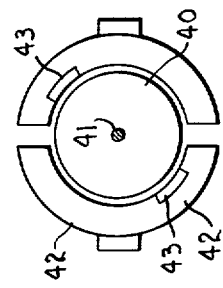
FIG. 4 is a top plan view of a portion of the rotary solenoid actuator.

Turning now more particularly to the construction of the rotary solenoid and with specific reference to FIGS. 4, 5 and 6, reference numeral 40 represents a rotary magnet with the indicator supporting pointer yoke 41 movable therewith. The magnet 40 is surrounded by the deflection poles 42, each of said deflection poles being semi-circular in shape and circumscribing substantially all of the circular edge of rotary magnet 40. A pair of retract poles 43 are located substantialy 180° apart and will cause rotary magnet 40 to align therewith when no power is being applied to the electromagnet 44.

Figure 1:
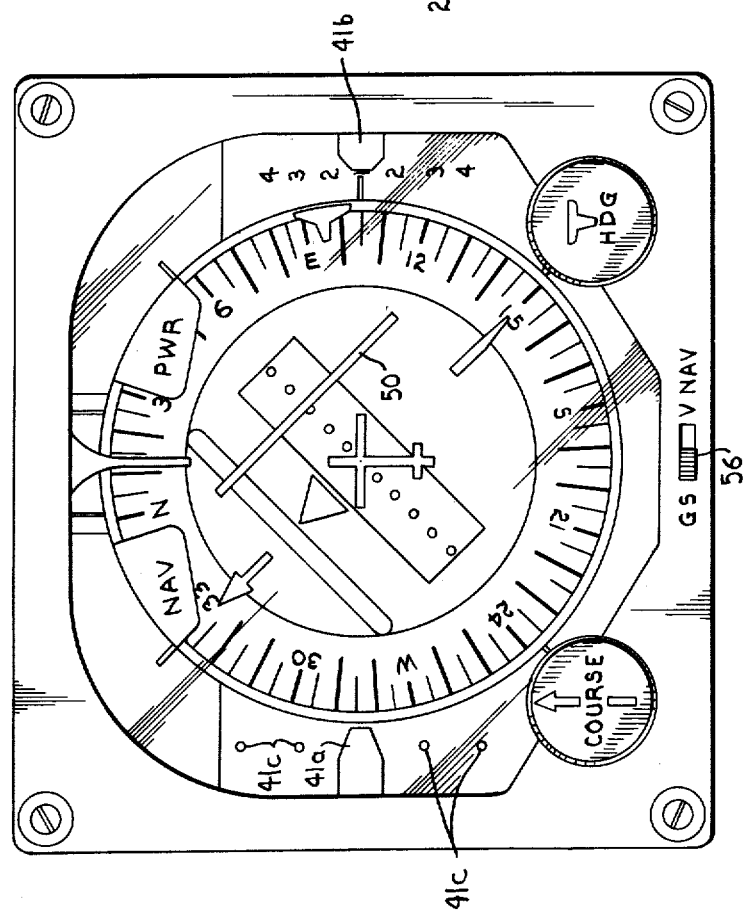
FIG. 1 is the front elevational view of an avionics indicator device showing the location of the glide slope pointer and the localizer deviation bar indicator in conjunction with other indicating devices.

As indicated above, the indicator supporting pointer yoke 41 with its two pointers 41a and 41b (see FIG. 1). The pointer 41a will be deflected between a total of two dots (41c) on the vertical scale to visually indicate the glide slope condition to the pilot. This physical positioning of pointer 41a is the result of the above described circuitry shown in FIGS. 2 and 3. The closed loop circuit, as indicated therein, will operate to effectively rotate the rotary magnet 40 and to properly orient yoke 41 and pointer 41a in accordance with the received glide slope signal. However, if a flag indication is received, the circuitry will operate to cut off the power to the electromagnets so that the rotary magnet 40 will immediately align with the retract poles 43. This operates to remove the pointers 41a and 41b from sight and will automatically indicate to the pilot that a flag condition (the inoperativeness of the indcator) is being received and that this particular instrument should be disregarded.

With the combined circuit and rotary solenoid described above, the meter movement utilizes considerably more torque than conventional d'Arsonval meter movements and is a complete closed loop system. If for any reason the power input thereto should fail, the meter movement will automatically and immediately be moved to one end or the other of the particular instrument and out of sight from the pilot. The chances of the movement being unable to be moved off center are highly remote so that failure in the circuitry is readily detected by the pilot since the pointer is pulled out of view.

The above explanation has been with reference to the glide slope signal. FIG. 3 shows the required switch contacts so that vertical navigation can also be selected. When it is selected, the device functions as previously described for glide slope but the pilot reads the VNAV pointer 41b and scale. In FIG. 4 the VNAV pointer is indicated by the numeral 41b with the data selection switch depicted at 56.

It should be understood that the localizer deflection bar identified by the numeral 50 in FIG. 1 is very suitable to a similar type of closed loop rotary solenoid indicator movement and that the same circuit concepts and benefits are also inherent when applied thereto. Other types of avionics equipment likewise utilized the above described concepts without departing from the scope of the invention.

From the foregoing it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An avionics indicator device having an indicator pointer operable to visually indicate aircraft deviation from a preselected condition, said device comprising
a deviation signal input,
means for producing an electrical signal corresponding to the position of said pointer,
means for summing said pointer position signal with said deviation signal input, said summing means having an output signal corresponding to the difference in said deviation signal input and said pointer position signal,
means for positioning said pointer in accordance with the output signal emanating from said summing means, said pointer positioning means including a rotary solenoid, said solenoid having a rotary magnet that is positionable in accordance with said summing means output signal, said indicator pointer being mechanically linked to said rotary magnet and operable to indicate said aircraft deviation, and
wherein said rotary solenoid includes at least one retract pole located adjacent said rotary magnet, said retract pole operable to automatically remove said pointer from view during a flag condition.

2. An avionics indicator device having an indicator pointer operable to visually indicate aircraft deviation from a preselected condition, said device comprising
a deviation signal input,
means for producing an electrical signal corresponding to the position of said pointer,
means for summing said pointer position signal with said deviation signal input, said summing means having an output signal corresponding to the difference in said deviation signal input and said pointer position signal,
means for positioning said pointer in accordance with the output signal emanating from said summing means, and
wherein said device has a flag condition signal input thereto, said flag signal being applied to said summing means,
means operable in accordance with a preselected flag signal condition to automatically remove said pointer from view thereby informing a pilot that said device is not operating to indicate said aircraft deviation.

3. The combination as in claim 2 wherein said pointer positioning means includes a rotary solenoid, said solenoid having a rotary magnet that is positionable in accordance with said summing means output signal, said indicator pointer being mechanically linked to said rotary magnet and operable to indicate said aircraft deviation.

4. An avionics indicator device having an indicator pointer operable to visually indicate aircraft deviation from a preselected condition, said device comprising
a deviation signal input,
means for producing an electrical signal corresponding to the position of said pointer,
means for summing said pointer position signal with said deviation signal input, said summing means having an output signal corresponding to the difference in said deviation signal input and said pointer position signal,
means for positioning said pointer in accordance with the output signal emanating from said summing means, and
wherein said signal producing means includes an optical means for detecting the position of said pointer.

5. The combination as in claim 4 wherein said pointer positioning means includes a means for positioning at least two pointers simultaneously, each one of said pointers having a scale for different aircraft deviation display information.

6. The combination as in claim 5 wherein said device includes a switch means for causing one or the other of said scales to indicate deviation information even though both of said pointers are visible.

7. The combination as in claim 4 wherein said pointer positioning means includes a rotary solenoid, said solenoid having a rotary magnet that is positionable in accordance with said summing means output signal, said indicator pointer being mechanically linked to said rotary magnet and operable to indicate said aircraft deviation.

8. The combination as in claim 7 wherein said rotary solenoid includes at least one retract pole located adjacent said rotary magnet, said retract pole operable to automatically remove said pointer from view during a flag condition.

9. The combination as in claim 4 wherein said device has a flag condition signal input thereto, said flag signal being applied to said summing means, and means operable in accordance with a preselected flag signal condition to automatically remove said pointer from view thereby informing a pilot that said device is not operating to indicate said aircraft condition.

10. The combination as in claim 9, wherein said pointer positioning means includes a rotary solenoid, said solenoid having a rotary magnet that is positionable in accordance with said summing means output signal, said indicator pointer being mechanically linked to said rotary magnet and operable to indicate said aircraft deviation.

* * * * *